(12) United States Patent
Silver

(10) Patent No.: US 12,253,480 B2
(45) Date of Patent: Mar. 18, 2025

(54) METHODS AND APPARATUS FOR DETERMINING INFORMATION REGARDING CHEMICAL COMPOSITION USING X-RAY RADIATION

(71) Applicant: Imagine Scientific, Inc., Norwood, MA (US)

(72) Inventor: Eric H. Silver, Needham, MA (US)

(73) Assignee: Imagine Scientific, Inc., Norwood, MA (US)

( * ) Notice: Subject to any disclaimer, the term of this patent is extended or adjusted under 35 U.S.C. 154(b) by 975 days.

(21) Appl. No.: 17/143,687

(22) Filed: Jan. 7, 2021

(65) Prior Publication Data

US 2021/0123873 A1 Apr. 29, 2021

Related U.S. Application Data

(63) Continuation of application No. 15/825,787, filed on Nov. 29, 2017, now abandoned, which is a continuation of application No. 14/749,592, filed on Jun. 24, 2015, now abandoned.

(60) Provisional application No. 62/016,203, filed on Jun. 24, 2014.

(51) Int. Cl.
*G01N 23/083* (2018.01)

(52) U.S. Cl.
CPC ..... *G01N 23/083* (2013.01); *G01N 2223/405* (2013.01); *G01N 2223/423* (2013.01)

(58) Field of Classification Search
CPC ........... G01N 23/083; G01N 2223/405; G01N 2223/423
See application file for complete search history.

(56) References Cited

U.S. PATENT DOCUMENTS

| | | | |
|---|---|---|---|
| 3,801,785 | A | 4/1974 | Barrett |
| 3,867,637 | A | 2/1975 | Braun et al. |
| 3,920,999 | A | 11/1975 | Drexler et al. |
| 4,048,486 | A | 9/1977 | Kriege |
| 4,048,496 | A | 9/1977 | Albert |

(Continued)

FOREIGN PATENT DOCUMENTS

| | | |
|---|---|---|
| CN | 1791960 A | 6/2006 |
| CN | 102484934 A | 5/2012 |

(Continued)

OTHER PUBLICATIONS

Gilbert et al. "The Organic-Mineral Interface in Biominerals" Reviews in Mineralogy and Geochemistry 59(1):157-185 (Jan. 2005) (Year: 2005).*

(Continued)

*Primary Examiner* — David A Vanore
(74) *Attorney, Agent, or Firm* — Wolf, Greenfield & Sacks, P.C.

(57) ABSTRACT

According to some aspects, a method is provided comprising generating first monochromatic x-ray radiation at a first energy, directing at least some of the first monochromatic x-ray radiation to irradiate subject matter of interest, detecting at least some of the first monochromatic x-ray radiation transmitted through the subject matter of interest, and determining information about a chemical composition of the subject matter of interest based, at least in part, on the detected first monochromatic x-ray radiation and the first energy.

20 Claims, 15 Drawing Sheets

(56) References Cited

U.S. PATENT DOCUMENTS

| | | |
|---|---|---|
| 4,174,481 A | 11/1979 | Liebetruth |
| 4,382,181 A | 5/1983 | Wang |
| 4,821,301 A | 4/1989 | Cocks et al. |
| 4,894,852 A | 1/1990 | Das Gupta |
| 4,903,287 A | 2/1990 | Harding |
| 4,945,552 A | 7/1990 | Ueda et al. |
| 5,073,915 A | 12/1991 | Zhang et al. |
| 5,081,658 A | 1/1992 | Imai et al. |
| 5,157,704 A | 10/1992 | Harding |
| 5,159,621 A | 10/1992 | Watanabe et al. |
| 5,257,303 A | 10/1993 | Das Gupta |
| 5,742,658 A | 4/1998 | Tiffin et al. |
| 5,787,146 A | 7/1998 | Giebeler |
| 5,940,469 A | 8/1999 | Hell et al. |
| 6,023,496 A | 2/2000 | Kuwabara |
| 6,141,400 A | 10/2000 | Schardt et al. |
| 6,298,113 B1 | 10/2001 | Duclos et al. |
| 6,560,313 B1 | 5/2003 | Harding et al. |
| 6,590,954 B1 | 7/2003 | Koch |
| 7,123,680 B2 | 10/2006 | Katada et al. |
| 7,336,764 B2 | 2/2008 | Reynolds |
| 7,358,506 B2 | 4/2008 | Daniel et al. |
| 7,394,890 B1 | 7/2008 | Wang et al. |
| 7,486,984 B2 | 2/2009 | Carroll |
| 7,567,650 B2 | 7/2009 | Harding et al. |
| 7,809,113 B2 | 10/2010 | Aoki et al. |
| 8,331,534 B2 | 12/2012 | Silver |
| 9,066,702 B2 | 6/2015 | Silver |
| 9,326,744 B2 | 5/2016 | Silver |
| 9,425,021 B2 | 8/2016 | Tamura et al. |
| 10,299,743 B2 | 5/2019 | Silver |
| 10,398,909 B2 | 9/2019 | Silver |
| 10,398,910 B2 | 9/2019 | Silver |
| 10,532,223 B2 | 1/2020 | Silver |
| 10,806,946 B2 * | 10/2020 | Silver .................. A61B 6/405 |
| 10,818,467 B2 | 10/2020 | Silver |
| 10,857,383 B2 | 12/2020 | Silver |
| 11,158,435 B2 * | 10/2021 | Silver ...................... G21K 1/10 |
| 11,185,714 B2 | 11/2021 | Silver |
| 11,213,265 B2 | 1/2022 | Silver |
| 11,744,536 B2 | 9/2023 | Silver |
| 11,833,369 B2 | 12/2023 | Silver |
| 2003/0227996 A1 | 12/2003 | Francke et al. |
| 2004/0046956 A1 | 3/2004 | Gould et al. |
| 2004/0264644 A1 | 12/2004 | Goebel et al. |
| 2005/0226378 A1 | 10/2005 | Cocks et al. |
| 2006/0115051 A1 | 6/2006 | Harding |
| 2006/0153332 A1 | 7/2006 | Kohno et al. |
| 2006/0176997 A1 | 8/2006 | Dilmanian et al. |
| 2006/0182223 A1 | 8/2006 | Heuscher |
| 2007/0014392 A1 | 1/2007 | Madey et al. |
| 2007/0138409 A1 | 6/2007 | Daniel |
| 2007/0147584 A1 | 6/2007 | Hofman |
| 2008/0069305 A1 | 3/2008 | Harding et al. |
| 2008/0084966 A1 | 4/2008 | Aoki et al. |
| 2011/0038455 A1 | 2/2011 | Silver et al. |
| 2011/0170666 A1 | 7/2011 | Chen et al. |
| 2012/0327963 A1 | 12/2012 | Hubbard et al. |
| 2013/0125963 A1 | 5/2013 | Binderbauer et al. |
| 2013/0188773 A1 * | 7/2013 | Silver .................... A61B 6/022 378/62 |
| 2013/0294576 A1 | 11/2013 | Pradhan et al. |
| 2014/0177801 A1 | 6/2014 | Lee et al. |
| 2014/0362973 A1 | 12/2014 | Ogura et al. |
| 2015/0003581 A1 | 1/2015 | Silver |
| 2015/0170868 A1 | 6/2015 | Heid et al. |
| 2015/0248942 A1 | 9/2015 | Bar-Davidson et al. |
| 2015/0357069 A1 * | 12/2015 | Yun ....................... H01J 35/147 378/84 |
| 2015/0366526 A1 | 12/2015 | Silver |
| 2015/0369758 A1 * | 12/2015 | Silver .................. G01N 23/083 378/53 |
| 2016/0120012 A1 | 4/2016 | Heid |
| 2016/0242713 A1 | 8/2016 | Silver |
| 2016/0249442 A1 | 8/2016 | Kuritsyn et al. |
| 2017/0027531 A1 | 2/2017 | Shiozawa et al. |
| 2017/0209575 A1 | 7/2017 | Xie et al. |
| 2017/0251545 A1 | 8/2017 | Klinkowstein et al. |
| 2018/0078229 A1 | 3/2018 | Wang |
| 2018/0284036 A1 | 10/2018 | Silver |
| 2018/0333591 A1 | 11/2018 | Silver |
| 2019/0009106 A1 | 1/2019 | Silver |
| 2019/0030362 A1 | 1/2019 | Silver |
| 2019/0083811 A1 | 3/2019 | Silver |
| 2019/0252149 A1 | 8/2019 | Silver |
| 2019/0298289 A1 | 10/2019 | Silver |
| 2020/0009402 A1 | 1/2020 | Silver |
| 2020/0090827 A1 | 3/2020 | Silver |
| 2020/0098537 A1 | 3/2020 | Yun et al. |
| 2020/0138388 A1 | 5/2020 | Silver |
| 2021/0251585 A1 | 8/2021 | Silver |
| 2022/0265235 A1 | 8/2022 | Silver |
| 2022/0323788 A1 | 10/2022 | Silver |
| 2024/0245373 A1 * | 7/2024 | Silver .................... H01J 35/112 |

FOREIGN PATENT DOCUMENTS

| | | |
|---|---|---|
| CN | 102859706 A | 1/2013 |
| CN | 104272424 A | 1/2015 |
| CN | 106605140 A | 4/2017 |
| DE | 19639241 A1 | 4/1998 |
| DE | 19639243 A1 | 4/1998 |
| EP | 2 420 112 B1 | 3/2017 |
| GB | 1443048 A | 7/1976 |
| JP | S49-97584 A | 9/1974 |
| JP | 50-056887 A | 5/1975 |
| JP | S50-120792 A | 9/1975 |
| JP | S60-249040 A | 12/1985 |
| JP | S63-304557 A | 12/1988 |
| JP | H01-190337 A | 7/1989 |
| JP | H03-266399 A | 11/1991 |
| JP | H04-019998 A | 1/1992 |
| JP | H04-337295 A | 11/1992 |
| JP | H04-363700 A | 12/1992 |
| JP | H05-346500 A | 12/1993 |
| JP | 06-109898 A | 4/1994 |
| JP | H06-103941 A | 4/1994 |
| JP | 06-277205 A | 10/1994 |
| JP | 07-095044 A | 4/1995 |
| JP | 2001-008924 A | 1/2001 |
| JP | 2001-224582 A | 8/2001 |
| JP | 2001-305079 A | 10/2001 |
| JP | 2002-208367 A | 7/2002 |
| JP | 2002-521676 A | 7/2002 |
| JP | 2005-091107 A | 4/2005 |
| JP | 2005-237730 A | 9/2005 |
| JP | 2006-038822 A | 2/2006 |
| JP | 2007-503703 A | 2/2007 |
| JP | 2007-207548 A | 8/2007 |
| JP | 2007-531204 A | 11/2007 |
| JP | 2008-016339 A | 1/2008 |
| JP | 2008-082766 A | 4/2008 |
| JP | 2008-122101 A | 5/2008 |
| JP | 2012-524374 A | 10/2012 |
| JP | 2015-104460 A | 6/2015 |
| JP | 2016-000313 A2 | 1/2016 |
| KR | 10-2015-0026730 A | 3/2015 |
| KR | 10-2015-0114347 A | 10/2015 |
| WO | WO 00/05727 A1 | 2/2000 |
| WO | WO 03/103495 A1 | 12/2003 |
| WO | WO 2003/103495 A | 12/2003 |
| WO | WO 2004/102609 A1 | 11/2004 |
| WO | WO 2005/008716 A2 | 1/2005 |
| WO | WO 2008/052002 A2 | 5/2008 |

OTHER PUBLICATIONS

Extended European Search Report dated Oct. 4, 2021 in connection with European Application No. 19750535.7.

Lin et al., Manufacture Quasi-monochromatic X-ray Machine to Replace 241 Am Low Energy Photon Source. Atomic Energy Science and Technology. Jan. 31, 2014;48(1):134-6.

(56) References Cited

OTHER PUBLICATIONS

Extended European Search Report for European Application No. EP 18801379.1 dated Mar. 9, 2021.
Extended European Search Report mailed Nov. 19, 2013 for Application No. 10764778.6.
Japanese Office Action for Japanese Application No. 2015-168321 mailed Aug. 9, 2016 and English translation thereof.
International Preliminary Report on Patentability for International Application No. PCT/US2015/037537 dated Jan. 5, 2017.
International Preliminary Report on Patentability for International Application No. PCT/US2015/037537 mailed Jan. 5, 2017.
International Preliminary Report on Patentability for International Application No. PCT/US2018/033526 mailed Nov. 28, 2019.
International Preliminary Report on Patentability for International Application No. PCT/US2019/017362 mailed Aug. 20, 2020.
International Preliminary Report on Patentability for International Application No. PCT/US2019/051042 mailed Mar. 25, 2021.
International Search Report and Written Opinion for International Application No. PCT/US2015/037537 dated Sep. 18, 2015.
International Search Report and Written Opinion for International Application No. PCT/US2010/001142 mailed Dec. 7, 2010.
International Search Report and Written Opinion for International Application No. PCT/US2018/33526 mailed Sep. 14, 2018.
International Search Report and Written Opinion for International Application No. PCT/US19/17362 mailed Apr. 23, 2019.
International Search Report and Written Opinion for International Application No. PCT/US2015/037537 mailed Sep. 18, 2015.
International Search Report and Written Opinion for International Application No. PCT/US2019/051042 mailed Dec. 4, 2019.
Invitation to Pay Additional Fees for International Application No. PCT/US2018/33526 mailed Jul. 26, 2018.
Gilbert et al., The organic-mineral interface in biominerals. Reviews in Mineralogy and Geochemistry. Jan. 1, 2005;59(1):157-85.
Kuramoto et al., Sharpening of an energy band of diagnostic x-ray spectrum with metal filters. World Congress Medical Physics and Biomedical Engineering. 2006;3(3):1533-1536.
Seidler et al., A laboratory-based hard x-ray monochromator for high-resolution x-ray emission spectroscopy and x-ray absorption near edge structure measurements. Review of scientific instruments. Nov. 20, 2014;85(11):113906-1-12.
Silver et al., The x-ray: reloaded. RT-IMAGE. Dec. 1, 2008;21(48):4 pages.
Marfeld et al., Fluor'X: a near monochromatic x-ray source. Proc. SPIE, Advances in Laboratory-based X-Ray Sources and Optics II. Dec. 6, 2001;(4502):117-25.

* cited by examiner

METHODS AND APPARATUS FOR DETERMINING INFORMATION REGARDING CHEMICAL COMPOSITION USING X-RAY RADIATION

RELATED APPLICATIONS

This application claims the benefit under 35 U.S.C. § 120 and is a continuation (CON) of U.S. application Ser. No. 15/825,787, filed Nov. 29, 2017, entitled "METHODS AND APPARATUS FOR DETERMINING INFORMATION REGARDING CHEMICAL COMPOSITION USING X-RAY RADIATION", which claims the benefit under 35 U.S.C. § 120 and is a CON of U.S. application Ser. No. 14/749,592, entitled "METHODS AND APPARATUS FOR DETERMINING INFORMATION REGARDING CHEMICAL COMPOSITION USING X-RAY RADIATION" filed on Jun. 24, 2015, which claims the benefit under U.S.C. § 119(e) of Provisional Application No. 62/016,203, entitled "DETERMINING EFFECTIVE CHEMICAL COMPOSITION USING MONOCHROMATIC X-RAY IMAGING," filed Jun. 24, 2014, each of the above mentioned applications is herein incorporated by reference in its entirety.

BACKGROUND

Conventional x-ray systems provide a technique for non-invasively visualizing internal structure of an object of interest by exposing the object to relatively high-energy electromagnetic radiation, commonly referred to as x-rays. X-rays emitted from a radiation source interact with the object and are absorbed, scattered and/or diffracted at varying levels by the internal structures of the object. For example, x-ray radiation is attenuated according to the various absorption characteristics of the materials that the x-rays encounter. By measuring the attenuation of the x-ray radiation that is transmitted through or otherwise exits the object, information related to the opacity distribution of the internal structure of the object may be obtained.

To perform this type of x-ray process, an x-ray source and an array of detectors (i.e., one or more detectors) responsive to x-ray radiation may be arranged about the object. X-rays impinging on a surface of the detectors cause the respective detector in the array to, for example, generate an electrical signal proportional to the intensity of the impinging x-ray radiation. This detector output can in turn be used to compute information regarding the opacity distribution of the internal structure of the object, for example, by reconstructing one or more images from the output of the detector array.

SUMMARY

Some embodiments include a method comprising generating first monochromatic x-ray radiation at a first energy, directing at least some of the first monochromatic x-ray radiation to irradiate subject matter of interest, detecting at least some of the first monochromatic x-ray radiation transmitted through the subject matter of interest, and determining information about a chemical composition of the subject matter of interest based, at least in part, on the detected first monochromatic x-ray radiation and the first energy.

Some embodiments include a system comprising a monochromatic x-ray radiation source configured to generate first monochromatic x-ray radiation at a first energy and to direct at least some of the first monochromatic x-ray radiation to irradiate subject matter of interest, a detector array arranged to detect at least some of the first monochromatic x-ray radiation transmitted through the subject matter of interest, and at least one processor programmed to determine information about a chemical composition of the subject matter of interest based, at least in part, on the detected first monochromatic x-ray radiation and the first energy.

BRIEF DESCRIPTION OF DRAWINGS

Various aspects and embodiments of the application will be described with reference to the following figures. The figures are not necessarily drawn to scale.

DETAILED DESCRIPTION

Figure 1:
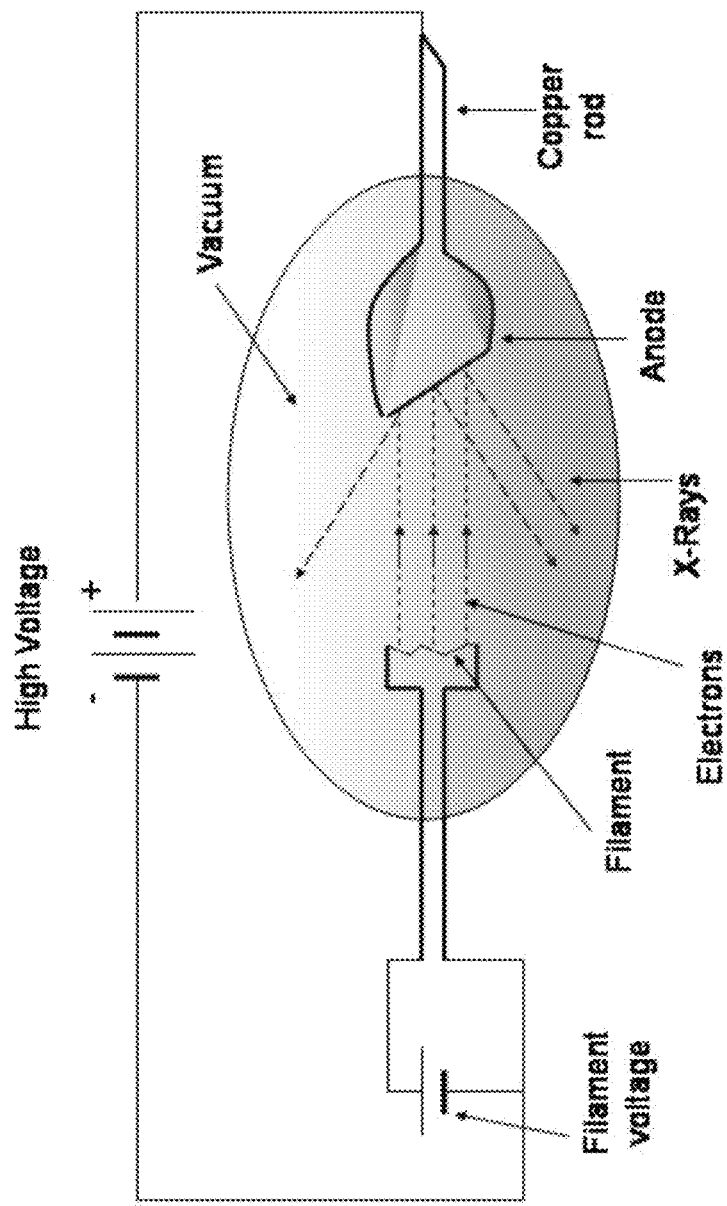
FIG. 1 is a schematic of a conventional x-ray tube.

As discussed above, conventional x-ray systems can provide information regarding the structural characteristics of regions within an object of interest. However, conventional x-ray systems used to perform, for example, diagnostic imaging do not have the capability to ascertain information about the chemical composition of the subject matter through which x-rays are transmitted. This inability is due in part to the fact that conventional x-ray systems perform imaging by detecting broad spectrum x-ray radiation transmitted through an object of interest (i.e., x-ray radiation containing x-rays having energies across a broad spectrum). For reasons that are discussed in further detail below, to determine information about the chemical composition of subject matter through which x-rays are passed, the energy of transmitted x-rays typically must be ascertainable. Because the broad spectrum x-ray radiation utilized by conventional x-ray imaging systems contain x-rays having energies across a substantially continuous spectrum, the energy of impinging x-rays would need to be measured to compute information regarding chemical composition. However, imaging detector arrays at the scale required cannot measure the energy of impinging x-rays at the spectral resolution needed to ascertain information regarding the chemical composition of subject matter of an object being imaged. Thus, conventional x-ray imaging systems cannot provide chemical composition information of subject matter of interest.

While detectors utilized in spectroscopic devices capable of analyzing small samples of material may have suitable spectral resolution, such detectors are not suitable for constructing relatively large scale arrays of the size needed to image relatively large objects in-vivo such as the breast, brain, torso or other portions of the anatomy in medical imaging, or large structures in various other non-destructive imaging applications. Thus, to utilize a detector employed in spectroscopic applications, a single such detector would need to be scanned over the object of interest, either by rotating and translating the source/detector, by rotating and translating the object, or if the field of view is large enough, translating the detector. Such a scanning procedure is too time consuming to be of practical use, may result in too high an x-ray dose (e.g., if a pencil beam is not utilized).

The inventor has appreciated that using monochromatic radiation allows for the determination of chemical composition of regions of an object of interest in an in vivo and/or non-destructive x-ray acquisition process. Specifically, because the energy of monochromatic x-rays are known and therefore need not be measured, conventional x-ray detectors can be used (e.g., conventional large area detector arrays). In particular, when monochromatic x-rays are used, detectors capable of detecting the intensity of x-rays impinging on the detector surface are sufficient. In this respect, an x-ray acquisition process that is conventional in some respects (e.g., that uses conventional detectors), but that uses monochromatic x-ray radiation instead of broad spectrum radiation, may be used to obtain x-ray information from which information about chemical composition (as well as the density distribution) of subject matter internal to an object of interest may be obtained. In addition, because monochromatic radiation is used, the x-ray dose to a patient in a medical x-ray procedure is substantially reduced, as discussed in further detail below.

According to some embodiments, monochromatic x-ray radiation is directed to irradiate an object of interest. At least some monochromatic x-rays radiation passing through the object is detected and the detected monochromatic x-rays are used to determine information about the chemical composition of material through which the x-rays passed. For example, a measure of one or more mass absorption coefficients may be computed based on the detected monochromatic x-rays. The one or more mass absorption coefficients may be used to identify material present through which the monochromatic x-rays passed. According to some embodiments, the material is identified, at least in part, by matching the one or more mass absorption coefficients to a characteristic curve associated with the material, as discussed in further detail below.

To perform techniques described herein, a source of monochromatic radiation is needed. Conventional techniques for producing monochromatic radiation, for example, using Bragg crystals or a synchrotron, may not be practicable in many circumstances. For example, Bragg crystals are relatively inefficient and may not generate monochromatic x-ray radiation at sufficient intensity in some circumstances. Synchrotron systems are multi-million dollar facilities that are not widely available as a result of the high-cost and the need to have a large, specialized installment. The inventor has developed a relatively low-cost, table-top method and apparatus for producing tunable monochromatic x-ray radiation capable of efficiently producing monochromatic x-ray radiation at desired energies. Examples of such monochromatic x-ray devices and methods are described in U.S. application Ser. No. 12/761,724, entitled "Monochromatic X-ray Methods and Apparatus," filed Apr. 16, 2010 and issued on Dec. 11, 2012 as U.S. Pat. No. 8,331,534 ('534 patent), which is herein incorporated by reference in its entirety. Aspects of exemplary monochromatic x-ray devices suitable for performing techniques described herein are described in further detail below.

To produce monochromatic x-ray radiation, a conventional x-ray tube that generates x-rays over a broad energy range may be used to irradiate a solid target, which in turn, will emit monochromatic fluorescent x-rays. The fluorescing target may be made from a single element or it may be a composite of several elements. The energies of these fluorescent x-rays are characteristic of the elemental composition of the target material, which can be chosen as desired. In this manner, a monochromatic x-ray device may be provided by, at least in part, combining in series a target that produces broad spectrum radiation in response to an incident electron beam, followed by a fluorescing target that produces monochromatic x-ray in response to incident broad spectrum radiation. The term "broad spectrum radiation" is used herein to describe Bremsstralung radiation with or without characteristic emission lines of the anode material. The principle of operation of such a device is described in further detail below.

Thick Target Bremsstrahlung

Figure 2:
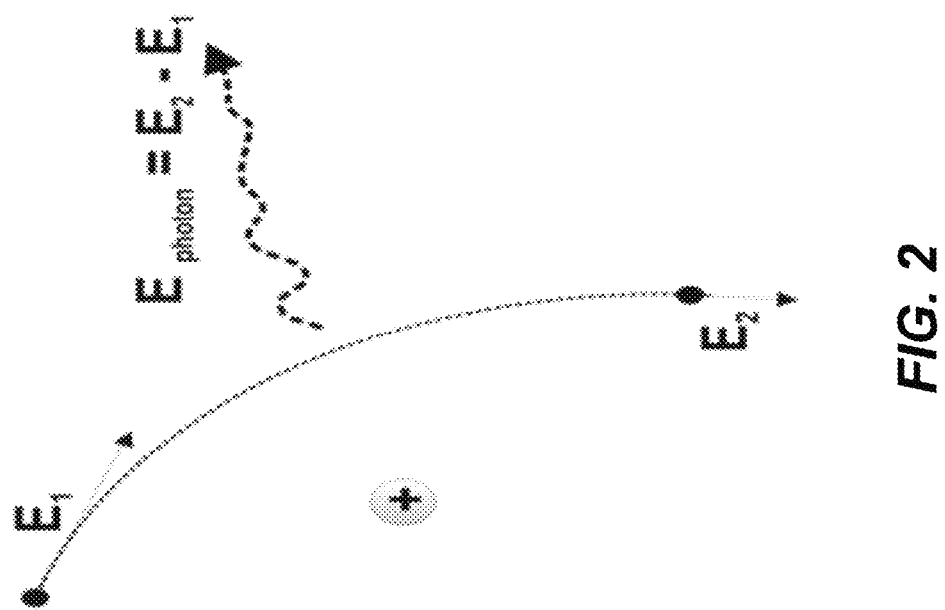
FIG. 2. illustrates the scenario in which an electron (much lighter than the nucleus) comes very close to the nucleus and the electromagnetic interaction causes a deviation of the trajectory where the electron loses energy and an x-ray photon is emitted and describes Bremsstralung in its simplest form.

In an x-ray tube electrons are liberated from a heated filament called the cathode and accelerated by a high voltage (e.g., ~50 kV) toward a metal target called the anode as illustrated schematically in FIG. 1. The high energy electrons interact with the atoms in the anode. Often an electron with energy $E_1$ comes close to a nucleus in the target and its trajectory is altered by the electromagnetic interaction. In this deflection process, it decelerates toward the nucleus. As it slows to an energy $E_2$, it emits an x-ray photon with energy $E_2-E_1$. This radiation is called Bremsstrahlung radiation (braking radiation) and the kinematics are shown in FIG. 2

Figure 3:
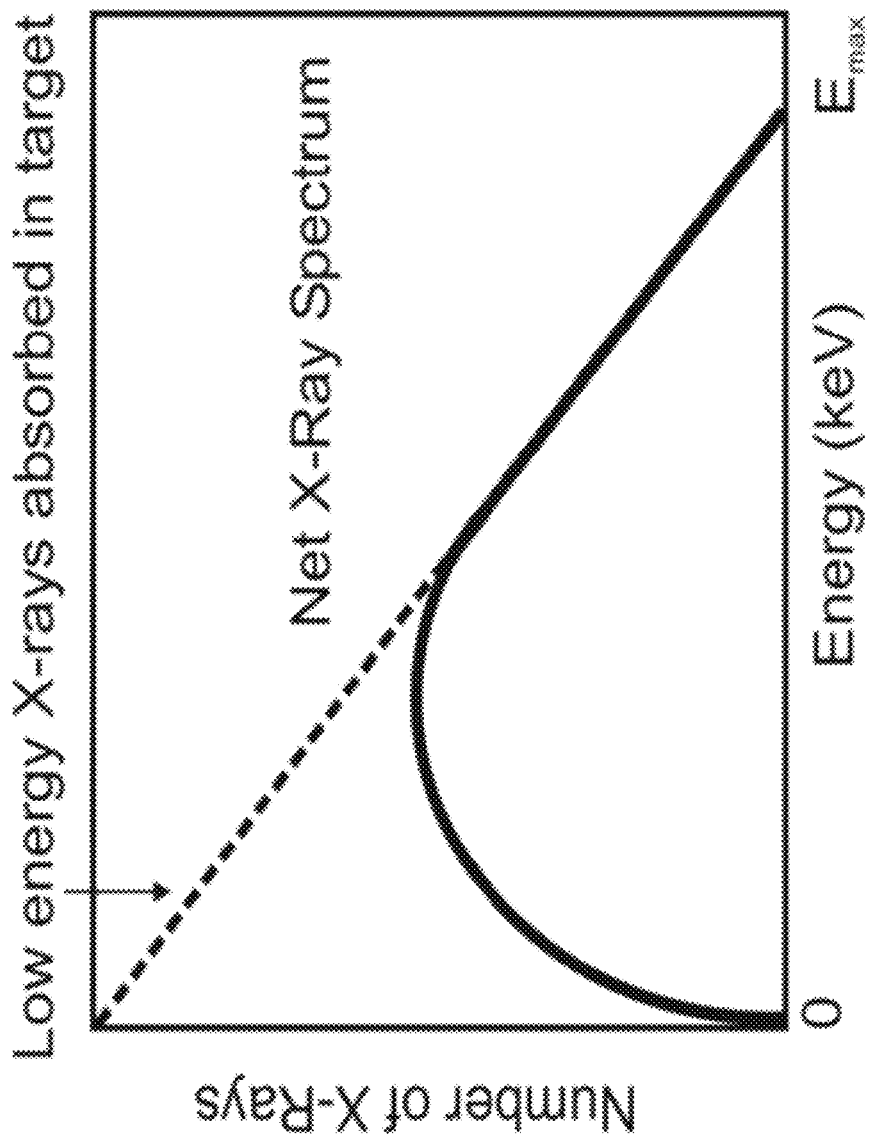
FIG. 3 illustrates the Bremsstrahlung spectrum produced by a typical x-ray tube, wherein the lower energy x-rays trying to escape the target are absorbed causing the characteristic roll over of the spectrum at low energies.

The energy of the emitted photon can take any value up to the maximum energy of the incident electron, $E_{max}$. As the electron is not destroyed it can undergo multiple interactions until it loses all of its energy or combines with an atom in the anode. Initial interactions will vary from minor to major energy changes depending on the actual angle and proximity to the nucleus. As a result, Bremsstrahlung radiation will have a generally continuous spectrum, as shown in FIG. 3. The probability of Bremsstrahlung production is proportional to $Z^2$, where Z is the atomic number of the target material, and the efficiency of production is proportional to Z and the x-ray tube voltage. Note that low energy Bremsstrahlung x-rays are absorbed by the thick target anode as they try to escape from deep inside causing the intensity curve to bend over at the lowest energies, as discussed in further detail below.

Characteristic Line Emission

Figure 4:
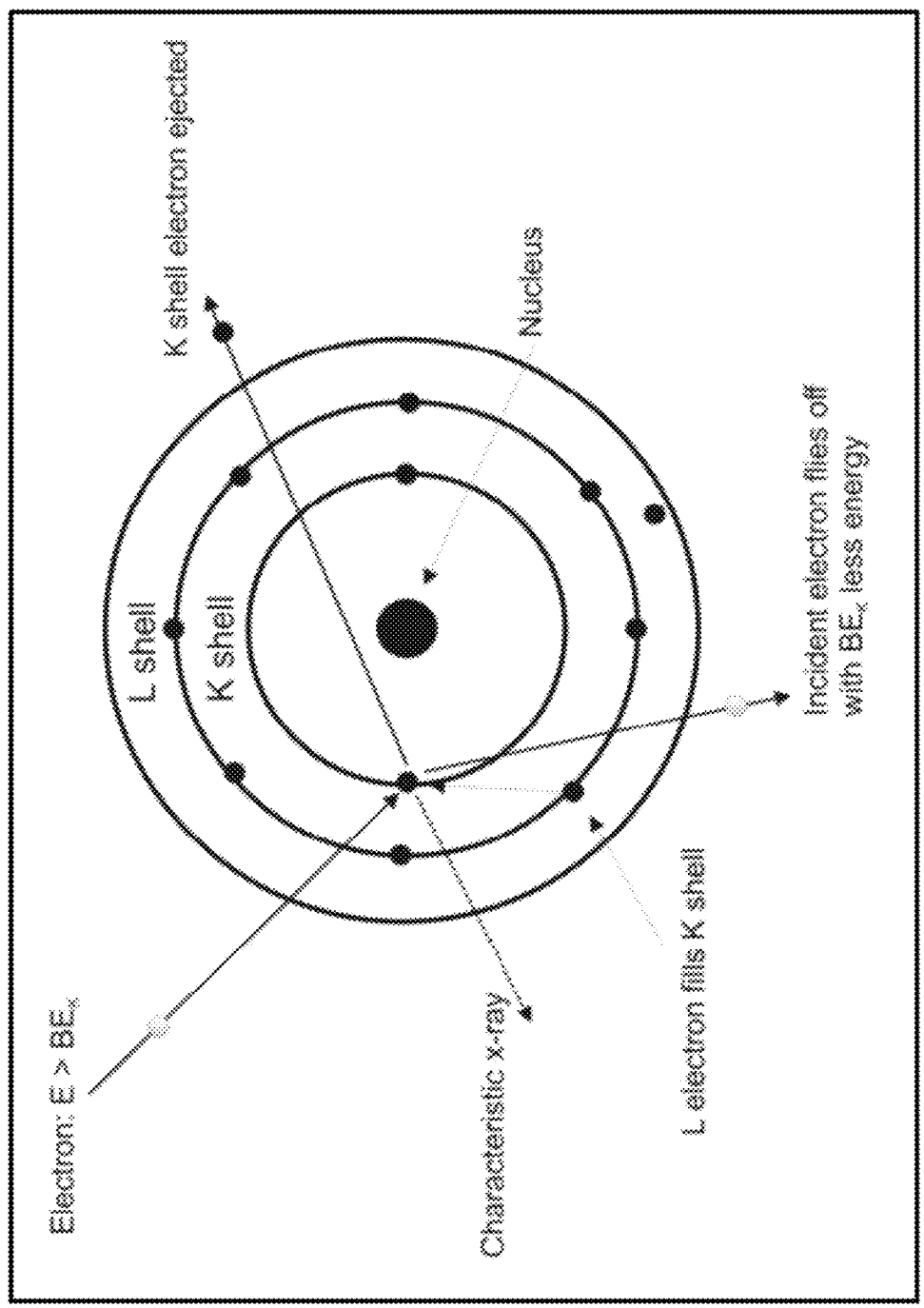
FIG. 4 illustrates the physical phenomenon that generates characteristic line emissions.
Figure 5:
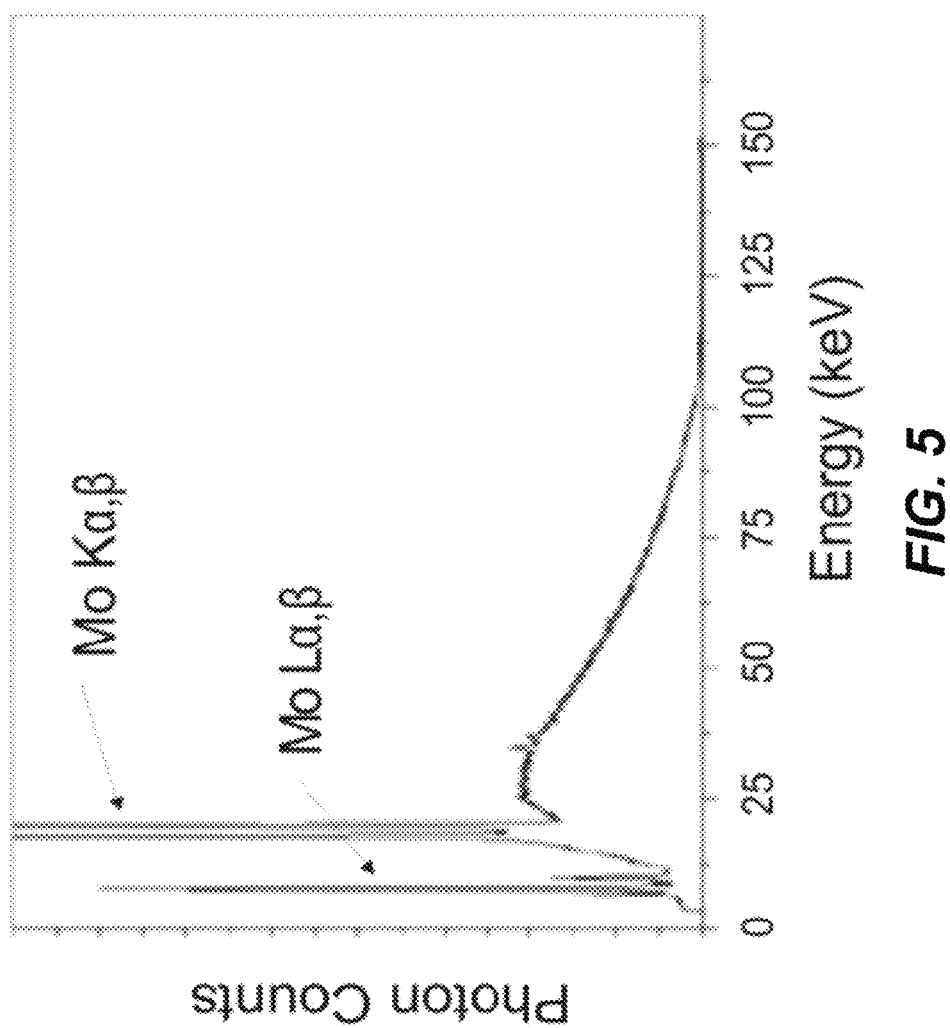
FIG. 5 illustrates the combined spectrum from an x-ray tube with a molybdenum anode showing the thick target Bremsstrahlung and the characteristic molybdenum line emission.

While most of the electrons slow down and have their trajectories changed, some will collide with electrons that are bound by an energy, BE, in their respective orbitals or shells that surround the nucleus in the target atom. As shown in FIG. 4, these shells are denoted by K, L, M, N, etc. In the collision between the incoming electron and the bound electron, the bound electron will be ejected from the atom if the energy of the incoming electron is greater than BE of the orbiting electron. For example, the impacting electron with energy $E > BE_K$, shown in FIG. 4, will eject the K-shell electron leaving a vacancy in the K-shell. The resulting excited and ionized atom will de excite as an electron in an outer orbit will fill the vacancy. During the de-excitation, an x-ray is emitted with an energy equal to the difference between the initial and final energy levels of the electron involved with the de excitation. Since the energy levels of the orbital shells are unique to each element on the Periodic Chart, the energy of the x-ray identifies the element. The energy will be monoenergetic and the spectrum appears monochromatic rather than a broad continuous band. Here, monochromatic means that the width in energy of the emission line is equal to the natural line width associated with the atomic transition involved. For copper Kα x-rays, the natural line width is about 4 eV. For Zr Kα, Mo Kα and Pt Kα, the line widths are approximately, 5.7 eV, 6.8 eV and 60 eV, respectively. The complete spectrum from an x-ray tube with a molybdenum target as the anode is shown in FIG. 5. The characteristic emission lines unique to the atomic energy levels of molybdenum are shown superimposed on the thick target Bremsstrahlung.

X-Ray Absorption and X-Ray Fluorescence

Figure 6A:
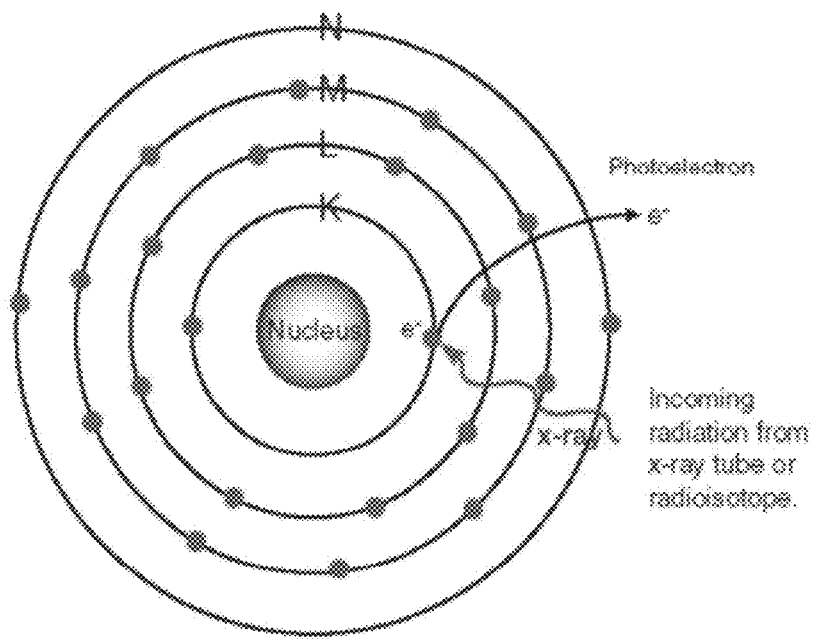
FIG. 6A illustrates the photoelectric effect.

When an x-ray from an x-ray tube strikes a sample, the x-ray can either be absorbed by an atom or scattered through the material. The process in which an x-ray is absorbed by an atom by transferring all of its energy to an innermost electron is called the photoelectric effect, as illustrated in FIG. 6A. This occurs when the incident x-ray has more energy than the binding energy of the orbital electron it encounters in a collision. In the interaction the photon ceases to exist imparting all of its energy to the orbital electron. Most of the x-ray energy is required to overcome the binding energy of the orbital electron and the remainder is imparted to the electron upon its ejection leaving a vacancy in the shell. The ejected free electron is called a photoelectron. A photoelectric interaction is most likely to occur when the energy of the incident photon exceeds but is relatively close to the binding energy of the electron it strikes. As an example, a photoelectric interaction is more likely to occur for a K-shell electron with a binding energy of 23.2 keV when the incident photon is 25 keV than if it were 50 keV. This is because the photoelectric effect is inversely proportional to approximately the third power of the x-ray energy.

Figure 6B:
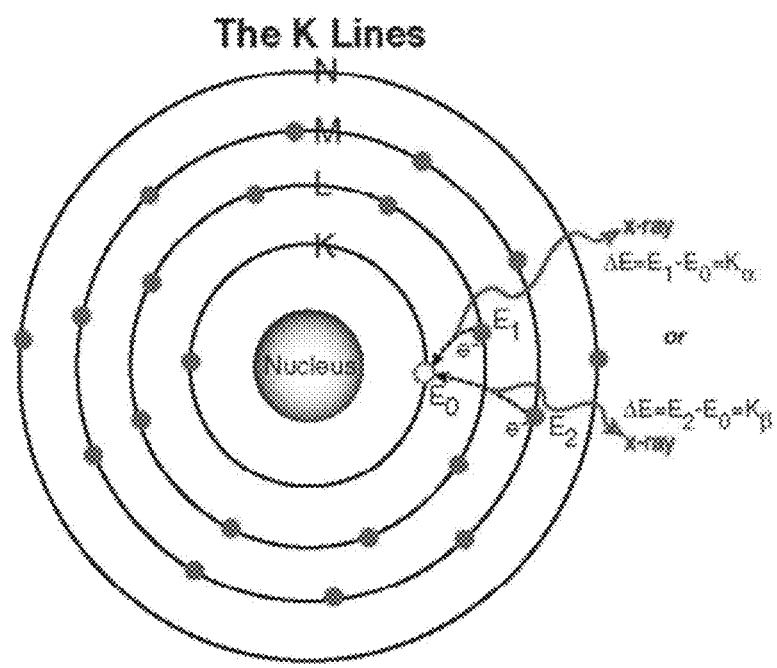
FIG. 6B illustrates the principle of x-ray fluorescence from the K-shell.
Figure 7:
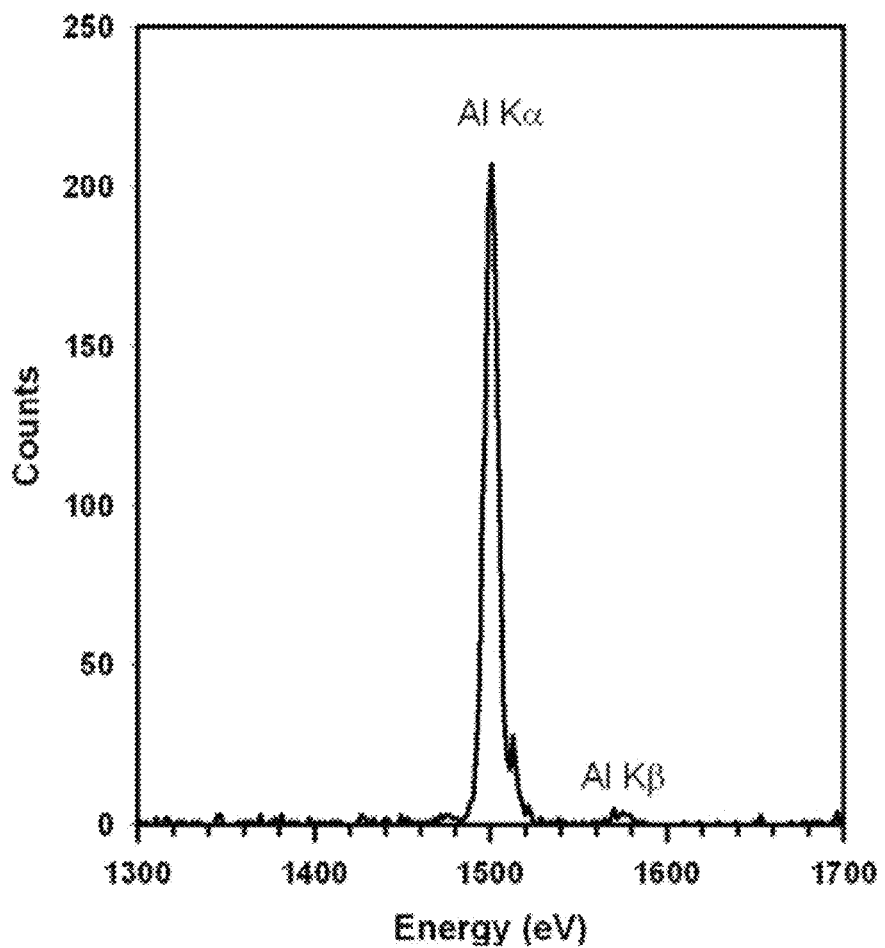
FIG. 7 illustrates an x-ray fluorescence spectrum made by irradiating a target of aluminum (Al) with copper x-rays which were generated by an x-ray tube with an anode of copper.

The vacancies in the inner shell of the atom present an unstable condition for the atom. As the atom returns to its stable condition, electrons from the outer shells are transferred to the inner shells and in the process emit a characteristic x-ray whose energy is the difference between the two binding energies of the corresponding shells as described above in the section of Characteristic Line Emission. This photon-induced process of x-ray emission is called x-ray Fluorescence, or XRF. FIG. 6B shows schematically x-ray fluorescence from the K-shell and a typical x-ray fluorescence spectrum from a sample of aluminum is shown in FIG. 7. The characteristic x-rays are labeled with a K to denote the shell where the original vacancy originated. In addition, alpha (α) and beta (β) are used to identify the x-rays that originated from the transitions of electrons from higher shells. Hence, a Kα x-ray is produced from a transition of an electron from the L to the K-shell, and a Kβ x-ray is produced from a transition of an electron from the M to a K-shell, etc. It is important to note that these monoenergetic emission lines do not sit on top of a background of broad band continuous radiation; rather, the spectrum is Bremsstrahlung free. As discussed above, the x-ray tube produces thick target Bremsstrahlung and characteristic x-rays from the copper in the anode target. But when the combined spectral emission from the x-ray tube is used to irradiate the aluminum sample, only the monoenergetic emission lines, Al Kα and Al Kβ are produced via x-ray fluorescence.

Figure 8:
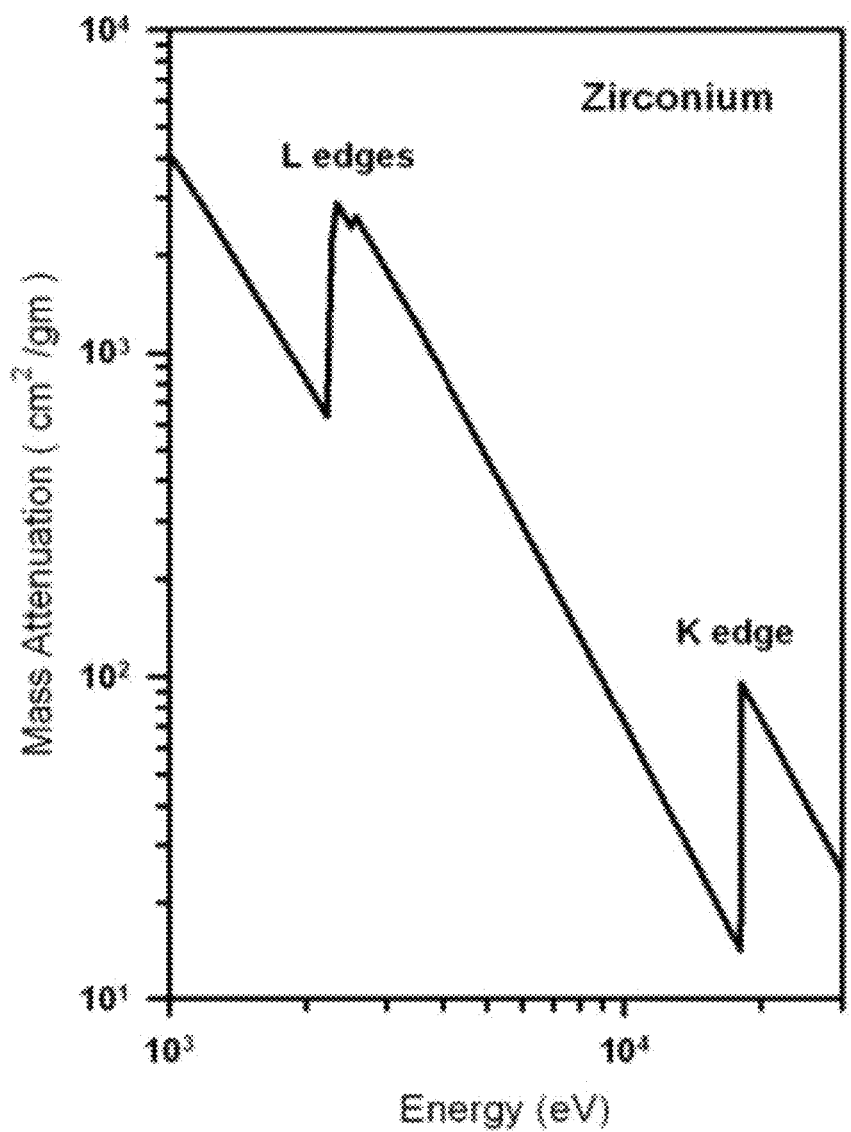
FIG. 8 illustrates the absorption coefficient as a function of x-ray energy for zirconium, wherein the discontinuous jumps or edges show how the absorption is enhanced just above the binding energies of the electrons in zirconium.

As mentioned above, the probability for x-ray absorption for a given absorbing element decreases with increasing energy of the incident photon. However, this fall off is interrupted by a sharp rise when the x-ray energy is equal to the binding energy of an electron shell (K, L, M, etc.) in the absorber. This is the lowest energy at which a vacancy can be created in the particular shell and is referred to as the edge. FIG. 8 shows the absorption of Zirconium as a function of x-ray energy. The absorption is defined on the ordinate axis by its mass attenuation coefficient. The absorption edges corresponding to the binding energies of the L-orbitals and the K-orbitals are shown by the discontinuous jumps at approximately 2.3 keV and 18 keV, respectively. Every element on the Periodic Chart has a similar curve describing its absorption as a function of x-ray energy.

Figures 14A, 14B:
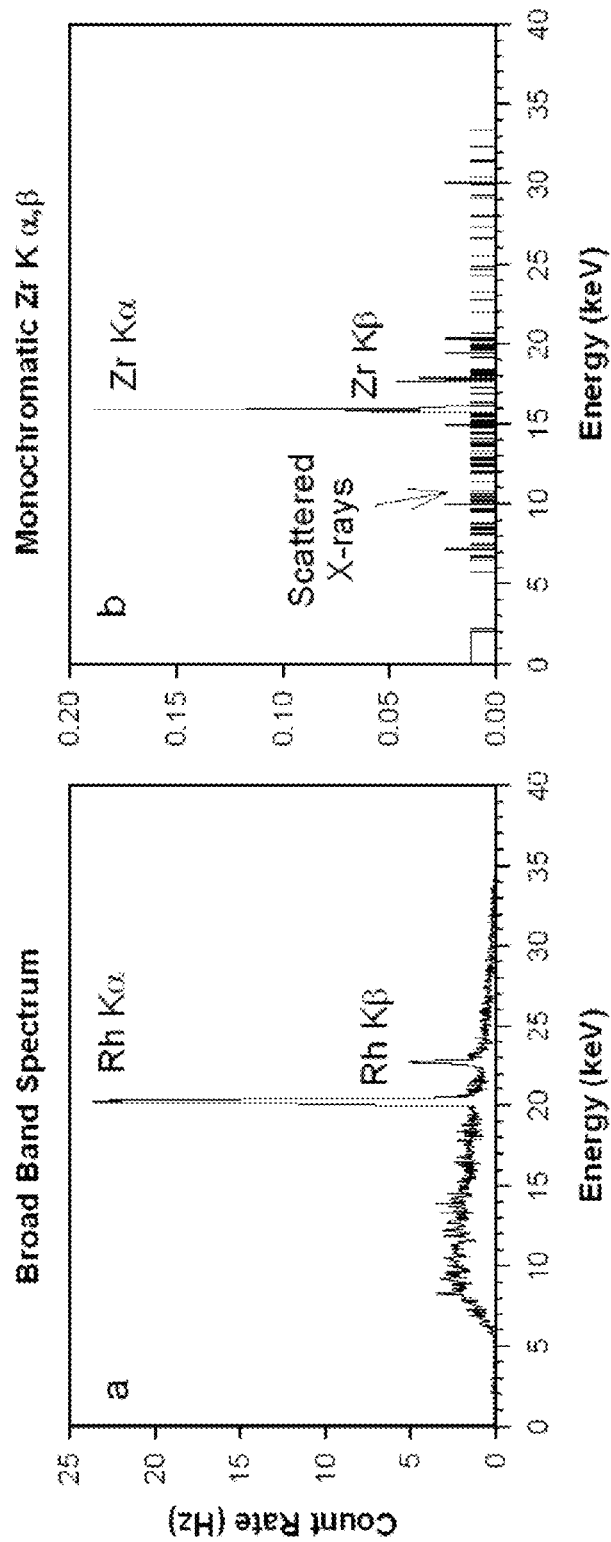
FIGS. 14A and 14B illustrate the thick target Bremsstrahlung spectrum generated by the conventional x-ray tube with a rhodium anode and the Zr K α and K β x-rays produced by x-ray fluorescence using the broad band spectrum in FIG. 13A, respectively.

As discussed above, a conventional x-ray tube generates a thick target broad band Bremsstrahlung spectrum as shown in FIG. 14A. The x-ray tube has a rhodium anode and the two peaks in the spectrum are rhodium Kα and Kβ line emission resulting from the electron excitation in the x ray tube. The spectrum in FIG. 14B shows the monochromatic Zr Kα and Kβ x-rays that are produced via fluorescence when the x-rays in the broad spectrum radiation irradiate the Zr target. It should be appreciated that the lines denoted by scattered x-rays are an artifact of the detectors and not an indication that the radiation from the fluorescent target is polychromatic, which is monochromatic.

Figure 9:
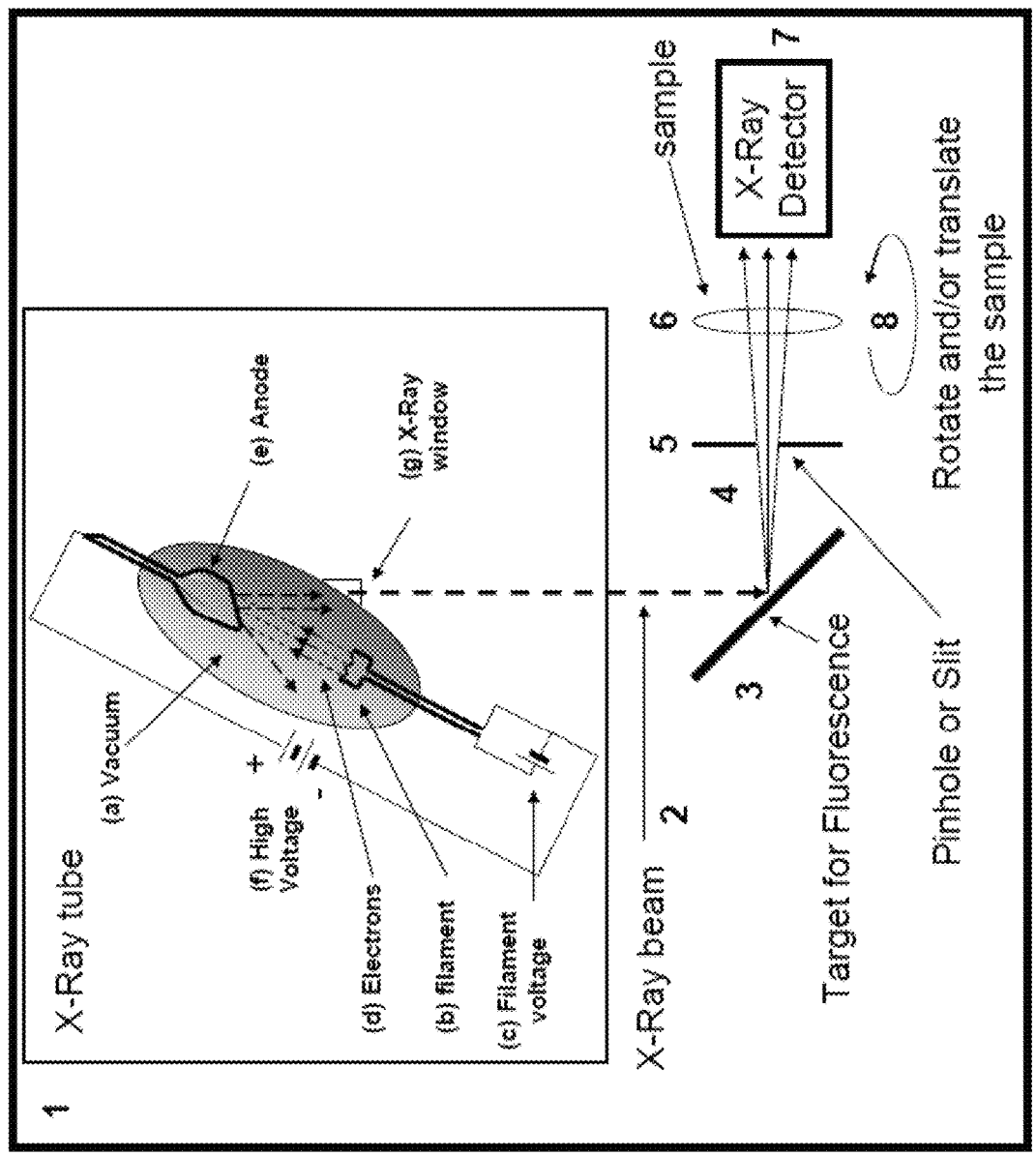
FIG. 9 illustrates a monochromatic x-ray system, in accordance with some embodiments of the present invention.

FIG. 9 illustrates a schematic of an x-ray apparatus for generating monochromatic x-rays, in accordance with some embodiments. An x-ray tube 1 generates thick target Bremsstrahlung radiation by ohmically heating a filament (b) (which operates as the cathode) with a voltage (c) (typically 5-6 volts) so that the filament emits electrons (d). The electrons are accelerated toward the anode (e) due to the high voltage bias (f) of the anode with respect to the filament (which is typically at zero or ground potential). As the electrons are decelerated by the anode, they generate Bremsstrahlung radiation as shown in FIG. 3 and a significant amount of ohmic power is dissipated by the anode in the form of heat. This heat may be conducted from the anode material to the outside of the vacuum enclosure. Characteristic emission lines unique to the anode material may also be produced by the electron bombardment of the anode material provided the voltage is large enough. The x-ray radiation exits the vacuum enclosure through a window (g) that is vacuum tight so that the x-rays may be transmitted with high efficiency (e.g. beryllium).

It should be appreciated that x-ray tube 1 may be a standard x-ray tube for generating broad spectrum radiation. For example, the x-ray tube may be similar to or the same as conventional x-ray tubes currently being used in medical applications. Accordingly, some embodiments of the x-ray apparatus described herein are capable of being manufactured as a relatively low-cost, table-top solution. As a result, such x-ray apparatus may be suitable for widespread adoption by medical facilities such as hospitals to perform monochromatic x-ray diagnostic and/or therapeutic applications, as described in further detail below.

The x-ray beam 2 emitted from the x-ray tube irradiates a fluorescent target 3 which produces monochromatic x-radiation characteristic of the element (s) in the target in response to the x-rays incident on the target. The monochromatic x-rays 4 diverge through an aperture (e.g., a pinhole or slit 5) and pass through the sample 6 (e.g., target tissue to be imaged or treated, as discussed in further detail below). For example, since the size of the spot on the fluorescent target is usually a few millimeters in diameter, an aperture such as a slit, pinhole or other aperture may be used to establish a source of monochromatic x-rays originating from a smaller diameter spot to improve spatial resolution in the image. The point source of the monochromatic x-rays diverges in the shape of a cone. These x-rays pass through the sample tissue and are detected by a detector array, for example, a 2D imaging x-ray detector. However, if the focal region on the fluorescent target (spot size) is compact enough, the aperture may be unnecessary. Other components may be used to collimate the x-rays to form a pencil beam, a fan beam or any other shaped beam, as the aspects of the invention are not limited in this respect. The x-ray tube, fluorescent target and, when present, any further mechanism to focus or shape the monochromatic x-rays, are collectively referred to herein as the monochromatic x-ray source. The transmitted monochromatic x-rays are detected by an x-ray detector 7 to produce an image of the sample.

For example, the monochromatic x-rays may penetrate the sample to produce a 2D image. In particular, a detector array may be arranged to detect the monochromatic x-rays transmitted through the object (e.g., a 1D or 2D detector array). The detected transmitted monochromatic x-rays may be used to compute one or more images, for example, by performing image reconstruction. If a 3D image is desired, the x-ray source and detector may be rotated around the object to detect monochromatic x-rays transmitted through the object at a plurality of different view angles about the object, or the source may be rotated or arranged at different angles while the detector remains fixed. Alternatively, the object may be rotated to obtain the x-ray attenuation data at different view angles. The x-ray data at the plurality of view angles may be used to reconstruct one or more images using any suitable computed tomography or computed tomosynthesis techniques (both referred to herein as CT). Other mechanisms may be used to actuate relative rotation or angular displacement between the x-ray source and the object to obtain x-ray attenuation data from a number of projection or view angles, as the aspects of the invention are not limited in this respect. It should be appreciated that some configuration will require the detector(s) to rotate in concert with the x-ray source to acquire the attenuation data.

The inventor has appreciated that it is beneficial to choose a material for the anode in the x-ray tube that will generate characteristic emission lines with energies that are larger than the energies of the monochromatic lines to be generated by the fluorescent target. This will improve the x-ray yield from the fluorescent target, but it is not a requirement on the embodiments of the invention. According to some embodiments, one or more x-ray lenses may be used to more efficiently collect the broad spectrum x-ray radiation emitted from the anode and focus the radiation onto a relatively small spot on the fluorescent target (e.g., the broad spectrum radiation may be focused on a compact region of the fluorescent target). For example, a glass capillary optic may be positioned between the anode and the fluorescent target to collect and focus the x-ray radiation. Use of one or more lenses may remove the need for an aperture between the fluorescent target and the sample. Since the optics will collect a larger amount of the x-rays emitted by the x-ray tube, the power of the x-ray tube may be reduced. The decrease in x-ray tube power may allow the apparatus to be air-cooled instead of water-cooled, further reducing the complexity and cost of the x-ray apparatus. It should be appreciated that one or more lens may be positioned between the fluorescent target and the sample to focus the monochromatic x-rays, either alone or in combination with optics arranged between the anode and the fluorescent target.

According to some embodiments, the x-ray apparatus in FIG. 9 is capable of generating pulsed monochromatic x-ray radiation. Pulsed x-ray radiation may be advantageous in reducing and/or eliminating motion artifacts in the resulting images due to motion of a human subject during radiation exposure. For example, imaging a beating heart using continuous x-ray radiation may cause blur in the resulting image(s) as the heart is in different locations/configurations at different times during the cardiac cycle. By pulsing the x-ray source, the x-ray radiation may be synced to the cardiac cycle such that imaging is performed at approximately the same time during the cardiac cycle to reduce and/or eliminate motion blur. It should be appreciated that any portion of the cardiac cycle may be imaged using such techniques. In addition, the breathing of a subject may result in similar motion artifacts and pulsing the x-ray source according to a predetermined exposure schedule may compensate for the motion caused by the subject's breathing (e.g., imaging may be performed during the approximate same time of the respiratory cycle). It should be appreciated that pulsing the radiation may be synced with other causes of subject motion, as the aspects of the invention are not limited in this respect.

According to some embodiments, x-ray pulsing is performed within the x-ray tube. For example, a timing circuit may be implemented to electronically open and close the circuit that generates the electrons flow from the cathode (e.g., filament) to the anode (target). This timing circuit may be configured to open and close the circuit according to any desired timing sequence. For example, the timing circuit may be controlled using a microcomputer having a clock to open and close the circuit according to a programmed timing sequence, which may be programmed to generate pulsed x-ray radiation according to any desired or any number of desired timing sequences.

According to some embodiments, x-ray pulsing is performed on the x-ray radiation itself. For example, a chopper (e.g., a rotating chopper) may be arranged to alternately block and pass either the broad spectrum radiation emitted from the first target and/or the monochromatic radiation emitted from the fluorescent target to achieve pulsed radiation according to a desired timing sequence. Dual choppers may be implemented to alternately block and pass both the broad spectrum radiation and the monochromatic radiation to achieve pulsed radiation at a desired timing sequence or at any number of desired timing sequences. It should be appreciated that other methods of generating pulsed x-ray radiation may be used, as the aspects of the invention are not limited in this respect. It should be appreciated that techniques for electronically pulsing the electron beam may be combined with techniques for blocking/passing the x-ray radiation, as the aspects of the invention are not limited for use with any type or combination of techniques for generating pulsed radiation.

According to some embodiments, the x-ray system comprises multiple fluorescent targets so that monochromatic x-rays of different energies can be produced. Such an x-ray system may be configurable to select one of the multiple fluorescent targets to produce monochromatic x-rays at a desired energy level. According to some embodiments, the fluorescent target utilized may be selected dynamically so that monochromatic radiation of different energies may be alternately provided.

It should be appreciated that there are other ways in which monochromatic x-rays may be generated that may be suitable for determining information about chemical composition of subject matter of interest. For example, while Bragg crystals and synchrotron systems may have associate drawbacks, these methods of generating monochromatic x-rays may be suitable in some circumstances, and the techniques described herein are not limited for use with any particular method or apparatus for generating monochromatic radiation.

Following below are more detailed descriptions of various concepts related to, and embodiments of, methods and apparatus for determining information about chemical composition. It should be appreciated that various aspects of the invention described herein may be implemented in any of numerous ways. Examples of specific implementations are provided herein for illustrative purposes only. In addition, the various aspects of the invention described in the embodiments below may be used alone or in any combination, and are not limited to the combinations explicitly described herein.

Figure 10:
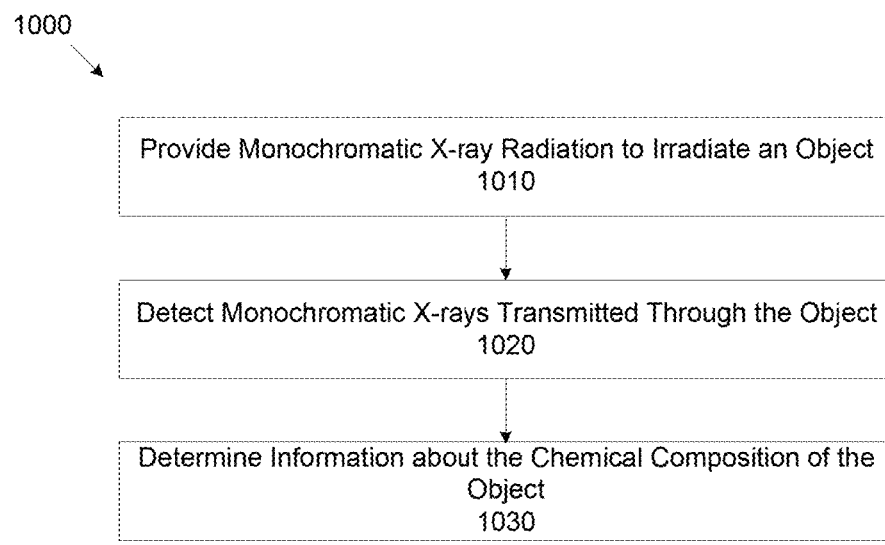
FIG. 10 is a flowchart illustrating a method of determining information about the chemical composition of subject matter internal to an object of interest, in accordance with some embodiments of the present invention.

FIG. 10 illustrates a method of using monochromatic x-ray radiation to determine information about the chemical composition of subject matter of interest through which the monochromatic x-ray radiation passes, in accordance with some embodiments. In act 1010, monochromatic x-ray radiation is provided to irradiate an object having internal subject matter of interest. Monochromatic x-ray radiation may be generated in any suitable manner. For example, monochromatic x-ray radiation may be generated by irradiating a fluorescent target with a broad spectrum source to produce fluorescent monochromatic radiation in the manner discussed above. Monochromatic radiation may be generated in other ways, such as by using Bragg crystals or using a synchrotron, though these techniques may not be suitable for all applications. Any other suitable method of generating monochromatic radiation may be used, as the aspects are not limited in this respect.

In act 1020, monochromatic x-rays transmitted through the object are detected. As discussed above, conventional detectors used in x-ray imaging systems are generally suitable and may be used to obtain x-ray information for determining information about the chemical composition of subject matter of interest internal to the object. For example, detector arrays used for CT (either computed tomography or tomosynthesis) may be used. The detector array may be a one-dimensional or two-dimensional detector array and may be rotatable or fixed as desired. For example, the detector array may be rotatable in conjunction with the x-ray source to provide monochromatic x-rays and detect transmitted monochromatic x-ray radiation at different view angles about the object of interest (e.g., to perform tomography), or the detector array may remain fixed and the x-ray source arranged at different angles about the object (e.g., to perform tomosynthesis). Alternatively, the detector array may be fixed and the object may be rotated to obtain x-ray information from different view angles. In either geometry, 2D and/or 3D x-ray information may be obtained. It should be appreciated that any array of detectors (i.e., one or more detectors) capable of detecting the intensity of x-rays impinging on the detector array may be used, as the aspects are not limited to any particular type or number of detectors or any particular detector array or detector array geometry.

In act 1030, information about the chemical composition of subject matter internal to the object of interest is obtained. For example, a measure of the atomic weight or effective atomic weight of subject matter internal to the object of interest may be computed. A measure of the mass absorption characteristic of subject matter of interest may be computed to facilitate identifying an element, compound, molecule and/or tissue type present in subject matter of interest. In particular, one or more computed mass absorption characteristics may be obtained and utilized to identify a characteristic curve corresponding to known material to ascertain that the known material is present, as discussed in further detail below. Information about the chemical composition of subject matter can be any information about the chemical makeup or composition of the subject matter.

Aspects of the inventor's insight derive from the fact that elements on the Periodic chart have unique atomic structure forming the basis for a normalized mass absorption coefficient, $\mu/\rho$, where $\rho$ is the density. The product of $\mu/\rho$ and $\rho$ yields the mass absorption coefficient, $\mu$, whose functional variation with x-ray energy is also unique. This relationship is illustrated in FIG. 11 where $\mu$, with dimensions of cm-1, is plotted for materials with atomic numbers 6-30 (carbon through zinc, respectively) with respective atomic weights 12-65.

Figure 11:
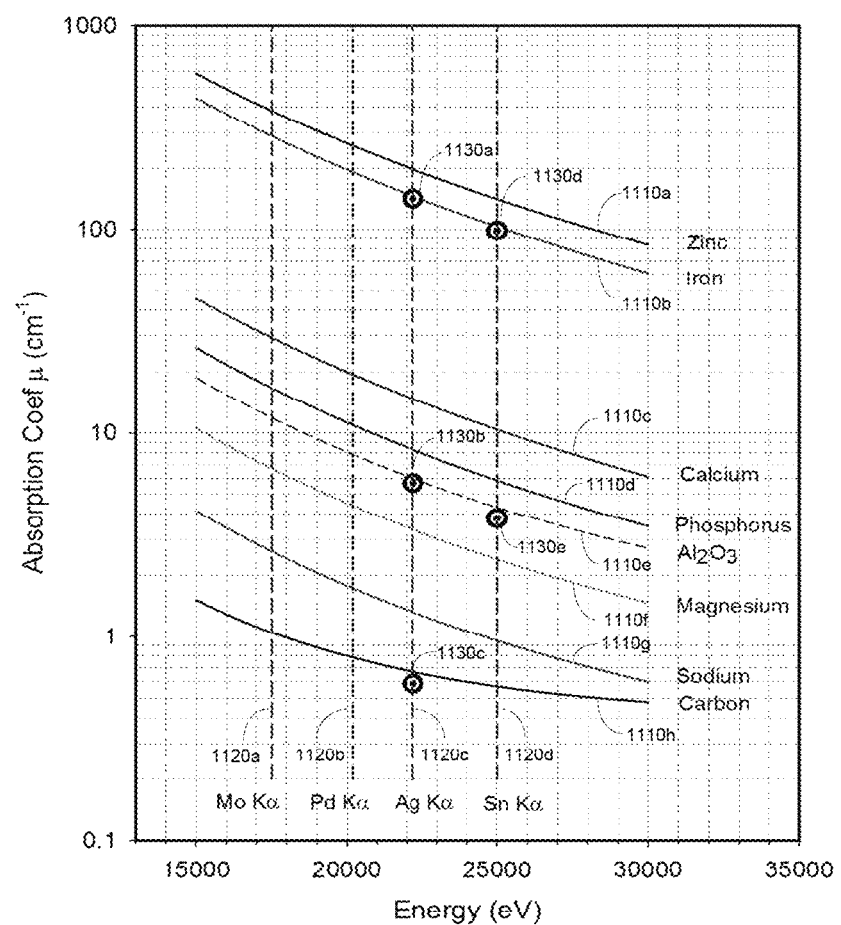
FIG. 11 is a diagram of characteristic curves showing the mass absorption coefficient as a function of x-ray energy for a number of exemplary substances, in accordance with some embodiments.

In particular, FIG. 11 illustrates characteristic curves 1110a-1110h for zinc, iron, calcium, phosphorus, aluminum oxide, magnesium, sodium and carbon, respectively. FIG. 11 also illustrates the energy of monochromatic x-ray emitted from four different fluorescent targets. In particular, energy 1120a corresponds to the energy of fluorescent x-rays (Kα x-rays) emitted from a molybdenum target, energy 1120b corresponds to the energy of fluorescent x-rays emitted from a palladium target, energy 1120c corresponds to the energy of fluorescent x-rays emitted from a silver target, and energy 1120b corresponds to the energy of fluorescent x-rays emitted from a tin target. The circles 1130a-1130e indicate μ values computed using techniques described herein, as discussed in further detail below. The characteristic curves of μ as a function of x-ray energy can be viewed as the "signature" for the corresponding material or substance. It should be appreciated that material comprising a combination of elements (e.g., compounds, molecules, tissue, tissue anomalies, etc.) too will exhibit a characteristic curve that can be used as a signature for the corresponding material. Thus, characteristic curves of material of interest can be obtained and utilized to identify when corresponding material is present by using the monochromatic x-ray techniques described in further detail below.

As discussed above, the inventor has appreciated that the use of monochromatic x-ray radiation permits the energy in the x-ray radiation to be known a priori, thus eliminating the need to measure the energy in transmitted x-rays. Because the x-ray energy is known from the monochromatic x-rays generated, μ-values may be computed as a measure of the mass absorption coefficient of material using attenuation information provided by detected monochromatic x-rays transmitted through the material. The computed μ-values can be compared to characteristic curves of material of interest to identify the closest characteristic curve. According to some embodiments, a measure of the mass absorption coefficient may be computed for material through which monochromatic x-ray radiation has passed and is detected using the following relationship:

$$\mu(E)=-[\ln(I_1/I_0)]/L \qquad (1).$$

Figure 12:
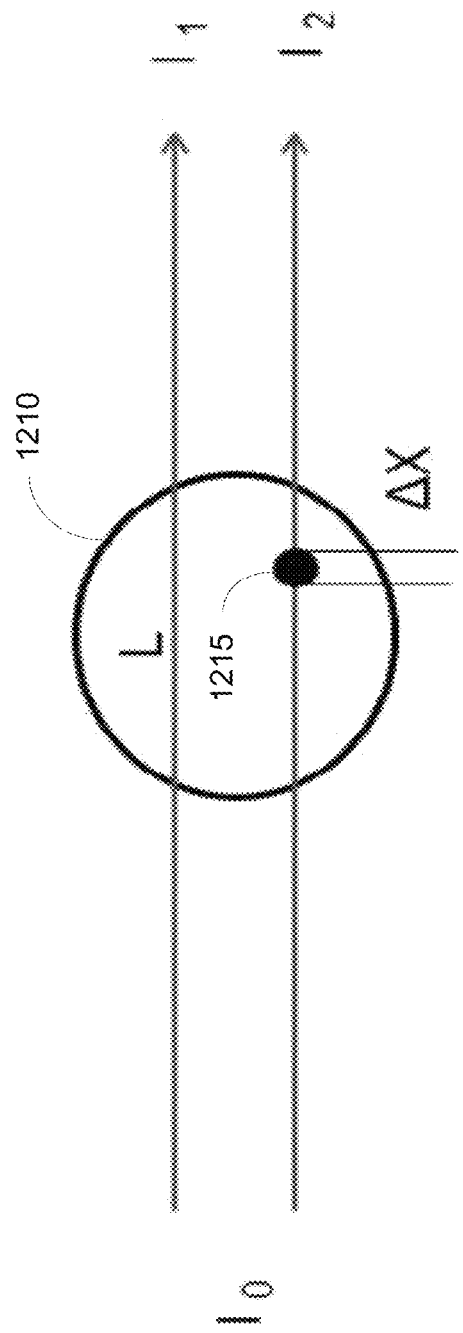
FIG. 12 illustrates a schematic illustrating relationships used to compute one or more mass absorption coefficients in accordance with some embodiments.

FIG. 12 schematically illustrates the relationship of equation (1). In particular, $I_0$ is a measure of the intensity of the monochromatic radiation prior to interaction with the object being exposed (e.g., the intensity of the x-rays emitted by the monochromatic x-ray source) and $I_1$ is the measured intensity of monochromatic x-rays exiting the object. Thus, $I_1/I_0$ provides the measured attenuation fraction resulting from the absorption of x-rays by subject matter internal to the object. In the expression in equation (1), L is the path length through the object along a ray between the monochromatic x-ray source and the respective detector, and E is the known x-ray energy of the monochromatic x-rays. Thus, a value for μ may be determined from the detected intensity of the monochromatic x-rays transmitted through the object. This μ-value may be compared to characteristics curves at energy E (i.e., the known energy of the monochromatic x-rays) to identify the closest characteristic curve to determine that the material corresponding to the identified characteristic curve is present.

FIG. 11 illustrates a number of μ-values using the above described technique. For example, μ-value 1130*a* was computed from attenuation information obtained by providing monochromatic x-rays emitted from a silver target to irradiate an object containing iron. Likewise, μ-value 1130*b* was computed from attenuation information obtained by providing monochromatic x-rays emitted from a silver target to irradiate an object containing aluminum oxide ($Al_2O_3$). In a similar manner, the other μ-values were similarly obtained using the monochromatic radiation techniques discussed herein. As shown, the obtained μ-values fall on or close to the characteristic curve for the corresponding substance such that the correct characteristic curve can be identified to determine information about the chemical composition of corresponding regions of an object.

The inventor has further appreciated that information about the chemical composition of subject matter of interest may also be determined when embedded in other material. Take as an example the circumstance in which a mass inside a larger volume is discovered during a routine x-ray imaging examination. FIG. 12 schematically illustrates this scenario where a mass 1215 (which may present as an elliptical region in a 2-D x-ray image, such as a 2-D x-ray image of a 3-D x-ray image) is located within a larger region 1210. To determine information about the chemical composition of the mass 1215, the attenuation fraction $I_1/I_0$ may be computed in the manner discussed above. Additionally, the attenuation fraction $I_2/I_0$ corresponding to the mass may also be computed in a similar fashion.

The length of the path through mass 1215, illustrated as Δx in FIG. 12, may be needed and may be obtained directly from the x-ray imaging data in which the mass was detected. For example, the x-ray imaging data may be automatically analyzed to ascertain the boundary or a dimension of the identified mass from which Δx may be determined. Any one or more image processing techniques may be utilized to identify the boundary of the mass or any dimension of interest thereof (e.g., Δx), as the aspects are not limited in this respect. For example, the boundary and/or any desired dimension of the mass may be determined based on one or any combination of techniques including computing edge information, performing region growing, using deformable models, etc. Alternatively, an operator such as a radiologist may indicate the bounds of the identified mass or a desired dimension thereof on the image itself. This information may be used to determine Δx. The boundary of the mass or any desired dimension may be identified in other ways, such as a combination of automated analysis and manual input from an operator.

According to some embodiments, once Δx has been obtained (or any pertinent dimension of the embedded mass), a measure of the mass absorption coefficient may be computed from attenuation information using the following relationship:

$$\mu_2(E)=[\ln A-\ln B]/\Delta x \qquad (2)$$

In the expression in equation (2), $A=I_1/I_0$, $B=I_2/I_0$, Δx is the path length through the embedded mass and E is the energy of the monochromatic x-rays. The computed $\mu_2$ may then be compared to the characteristic curves at energy E to identify the closest curve, thereby determining information about the chemical composition of the embedded mass. In this manner, the chemical composition of a localized region of interest can be determined. As discussed above, a region of interest may be identified from one or more acquired x-ray images (e.g., may be identified by a radiologist). Such x-ray images may be acquired using conventional broad spectrum techniques, or may be acquired using monochromatic x-rays using techniques discussed in the foregoing and described in further detail in the '534 patent incorporated by reference herein. When monochromatic x-rays are used for imaging internal structure of an object, the information needed to determine information about the chemical composition of subject matter within an object is available using the same x-ray attenuation information acquired for imaging purposes. In this respect, a single acquisition procedure allows for both imaging and evaluating chemical composition, providing a low dose process for ascertaining varied diagnostic information about subject matter of interest.

According to some embodiments, a μ-value at a single energy is determined and compared to characteristic curves to identify the closest curve. While doing so may be suitable in many circumstances, the inventor has appreciated that determining μ-values at multiple energies may provide a more discriminating means of identifying the closet characteristic curve in some instances. For example, while the computed μ-values in FIG. 11 lie closest to the correct curve, x-ray attenuation information from in-vivo acquisition procedures may be noisy and/or may include combinations of material so that computed μ-values fall somewhere in between two characteristic curves, with the possibility that a computed μ-value will fall closer to an incorrect characteristic curve than the correct characteristic curve. By computing multiple μ-values at different respective energies, multiple μ-values can be used together to decrease the chances that the incorrect characteristic curve is matched. For example, two μ-values provide slope information that may be useful in better distinguishing between different characteristic curves. By increasing the number of μ-values further, higher level information and/or more accurate curve matching techniques may be used to facilitate accurately identifying the correct characteristic curve.

Additionally, the exemplary characteristic curves illustrated in FIG. 11 are non-overlapping. However, characteristic curves of different materials and/or compound materials may have overlapping characteristic curves. In such circumstances, it may be difficult to match a single computed µ-value to the correct characteristic curve when characteristic curves are close together, cross and/or overlap. However, multiple µ-values obtained at different energy levels may provide discriminating information that facilitates the identification of the correct characteristic curve. According to some embodiments, a plurality of µ-values computed at respective different monochromatic x-ray energies are obtained and used to identify the closest matching characteristic curve to determine information about the chemical composition of the subject matter of interest. To do so, the above described techniques may be repeated using monochromatic x-rays at different respective energies.

As discussed above, the energy of monochromatic x-rays may be changed by using different material for the fluorescent target. Accordingly, a plurality of µ-values may be obtained using a system that has multiple fluorescent targets. It should be appreciated that any number of fluorescent targets may be used to allow for obtaining any number of µ-values to facilitate the identification of the correct characteristic curve. The x-ray attenuation information at different monochromatic x-ray energies may be obtained in any manner. For example, the x-ray attenuation information at different energies may be obtained serially by using a first fluorescent target to obtain the needed x-ray attenuation information at a first energy and subsequently using a second fluorescent target to obtain the needed x-ray attenuation information at a second energy. Alternatively, x-ray attenuation information at different energies may be obtained in parallel by alternating between the first target and the second target in a time slicing sequence. Other methods of obtaining x-ray attenuation information at multiple monochromatic x-ray energies may be used, as the aspects are not limited in this respect.

According to some embodiments, monochromatic x-rays are provided at multiple energies simultaneously and a detector array capable of detecting the energy of impinging x-rays (e.g., a detector array having suitable spectral resolution for the selected energies) is utilized to determine the energy of the x-rays corresponding to one or more computed µ-values for use in comparing to relevant characteristic curves. In this way, a single acquisition procedure can produce x-ray attenuation information at any number of x-ray energies to facilitate determining information about the chemical composition of subject matter of interest using the techniques described herein, thereby reducing the amount of time needed and providing a relatively low dose solution to determining chemical composition information and/or performing low-dose monochromatic x-ray imaging.

Figure 13:
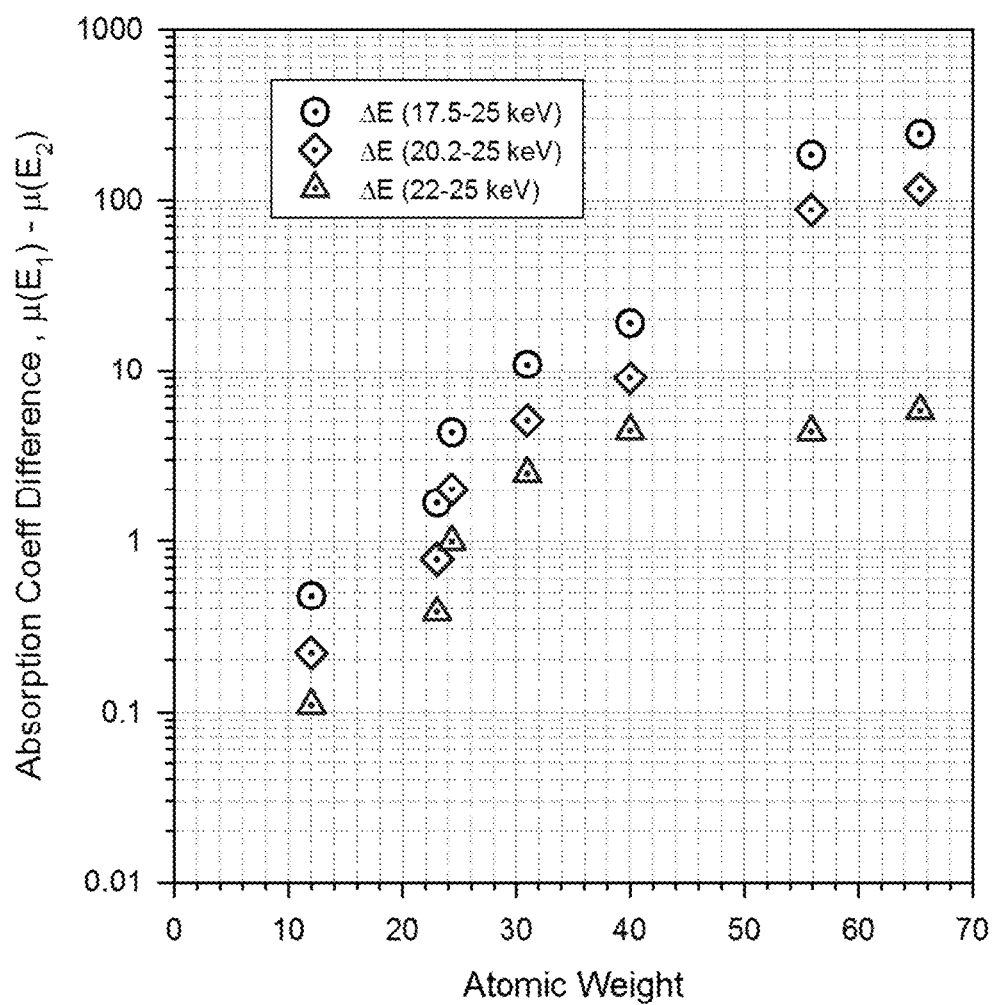
FIG. 13 illustrates the difference between mass absorption coefficients at different x-ray energies as a function of atomic weight.

Multiple µ-values may be used in other ways to facilitate identifying the correct characteristic curve. For example, the difference of two µ-values may provide a more sensitive measure to match a characteristic curve. FIG. 13 illustrates a diagram of the difference between the absorption coefficient at two energies plotted as a function of atomic weight. Three sets of data are presented; (circles): $\mu(17.5\text{ key})-\mu(25\text{ kev})$, (diamonds): $\mu(20.2\text{ key})-\mu(25\text{ key})$, and (triangles): $\mu(22\text{ key})-\mu(25\text{ key})$. The sensitivity for determining the atomic weight of heavier elements or compounds increases as the difference in the monochromatic energies gets larger. Thus, selection of the monochromatic energies may be selected intelligently to assist in identifying the presence of particular subject matter of interest.

It should be appreciated that characteristic curves may be generated for any material of interest, including elements, compounds, molecules, tissue, anomalous tissue such as tumors, etc. The above described techniques may be used to determine when such material is present by comparing one or more computed µ-values obtained at one or more x-ray energies to characteristic curves for the material of interest. According to some embodiments, the one or more computed µ-values are compared to a characteristic curve to determine whether the respective material is present. For example, the one or more computed µ-values may be compared to a characteristic curve for tumor material to determine whether tumor material is present and, if the signatures of benign and malignant tumors are different, to determine the nature of the tumor. In this respect, the techniques described herein may be used to avoid biopsy procedures. As another example, one or more computed µ-values may be used in non-biological applications to detect the presence of materials (asbestos, radium, rust, etc.) in structural objects. Thus, it should be appreciated that the techniques described herein can be used to detect the presence of any material of interest for which characteristic information (e.g., a characteristic curve) can be obtained, as the techniques are not limited for use with any particular application and/or material.

Figure 15:
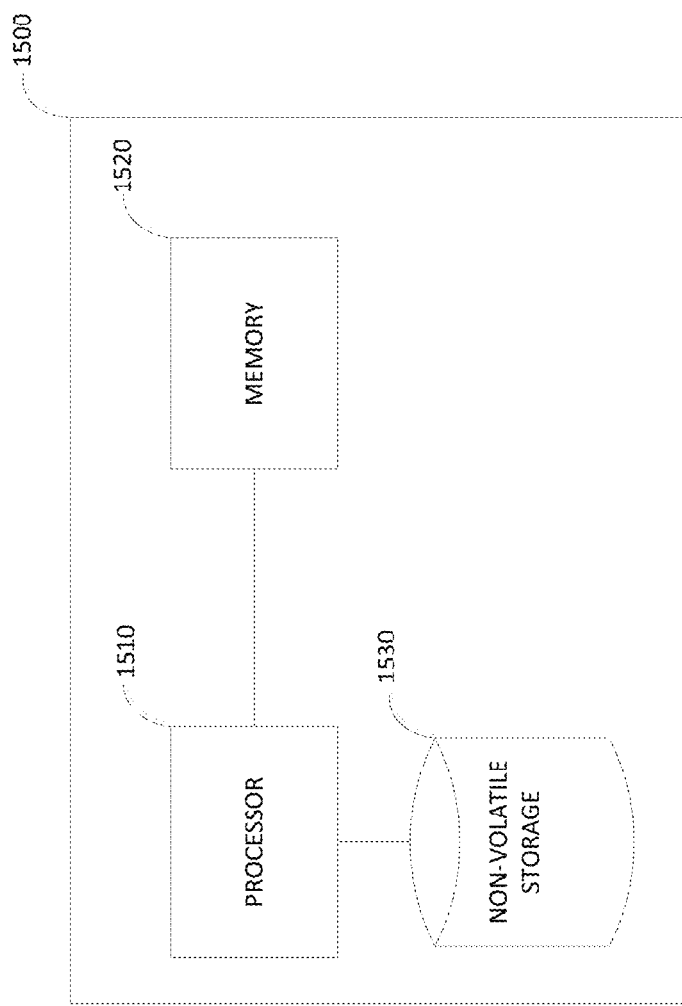
FIG. 15 is a diagram of a computer system on which techniques described herein may be implemented.

An illustrative implementation of a computer system 1500 that may be used to implement one or more of the techniques described herein is shown in FIG. 15. For example, a computer system 1500 may be used to implement any one or more of the techniques described in connection with the method illustrated in FIG. 10. Computer system 1500 may include one or more processors 1510 and one or more non-transitory computer-readable storage media (e.g., memory 1520 and one or more non-volatile storage media 1530). The processor 1510 may control writing data to and reading data from the memory 1520 and the non-volatile storage device 1530 in any suitable manner, as the aspects of the invention described herein are not limited in this respect. Processor 1510, for example, may be a processor on a mobile device, a personal computer, a server, an embedded system, etc., that can connect to, or that is part of, an x-ray system (e.g., the x-ray system illustrated in FIG. 9).

To perform functionality and/or techniques described herein, the processor 1510 may execute one or more instructions stored in one or more computer-readable storage media (e.g., the memory 1520, storage media, etc.), which may serve as non-transitory computer-readable storage media storing instructions for execution by processor 1510. Computer system 1500 may also include any other processor, controller or control unit needed to route data, perform computations, perform I/O functionality, etc. For example, computer system 1500 may include any number and type of input functionality to receive data and/or may include any number and type of output functionality to provide data, and may include control apparatus to perform I/O functionality.

In connection with performing techniques described herein (e.g., determining information about the chemical composition of subject matter of interest, performing x-ray imaging, or both), one or more programs configured to receive x-ray information as input, process the input or otherwise execute functionality described herein may be stored on one or more computer-readable storage media of computer system 1500. In particular, some portions of a system configured to determine information about the chemical composition of subject matter and/or to reconstruct one or more x-ray images may be implemented as instructions stored on one or more computer-readable storage media. Processor 1510 may execute any one or combination of such programs that are available to the processor by being stored locally on computer system 1500 or accessible over a network. Any other software, programs or instructions described herein may also be stored and executed by computer system 1500. Computer system 1500 may represent the computer system on an x-ray imaging device and/or may represent a computer system connected to an x-ray imaging device, for example, via one or more networks. Computer system 1500 may be implemented as a standalone computer, server, part of a distributed computing system configured to communicate with one or more other computers connected to a network, etc.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements The above-described embodiments of the present invention can be implemented in any of numerous ways, and the examples described herein are not limiting. In addition, various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings.

Also, various inventive concepts may be embodied as one or more processes, of which multiple examples have been provided. The acts performed as part of each process may be ordered in any suitable way. Accordingly, embodiments may be constructed in which acts are performed in an order different than illustrated, which may include performing some acts concurrently, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method of determining information about a chemical composition of subject matter of interest in vivo, the method comprising:
generating broad spectrum x-ray radiation;
directing at least some of the broad spectrum x-ray radiation to irradiate a first fluorescent target configured to generate monochromatic x-ray radiation via fluorescence in response to incident broad spectrum x-ray radiation;

generating first monochromatic x-ray radiation at a first energy via fluorescence by the first fluorescent target in response to at least some broad spectrum x-ray radiation incident on the first fluorescent target;

directing at least some of the first monochromatic x-ray radiation to irradiate subject matter of interest internal to a patient in-vivo;

detecting at least some of the first monochromatic x-ray radiation transmitted through the subject matter of interest; and determining information about the chemical composition by determining at least one element, compound and/or molecule that is present in the subject matter of interest based on the detected first monochromatic x-ray radiation and the first energy.

2. The method of claim 1, wherein determining information about the chemical composition of the subject matter of interest includes computing a first mass absorption coefficient value of the subject matter of interest based, at least in part, on the detected first monochromatic x-ray radiation.

3. The method of claim 2, wherein determining information about the chemical composition of the subject matter of interest includes using the computed first mass absorption coefficient value of the subject matter of interest and the first energy to determine that material is present in the subject matter of interest.

4. The method of claim 3, wherein determining information about the chemical composition of the subject matter of interest includes identifying one of a plurality of characteristic curves based, at least in part, on the computed first mass absorption coefficient value of the subject matter of interest and the first energy.

5. The method of claim 4, wherein each of the plurality of characteristic curves represents mass absorption coefficient values as a function of energy for a respective material, and wherein identifying one of the plurality of characteristic curves includes identifying which of the plurality of characteristic curves best matches the computed first mass absorption coefficient value at the first energy.

6. The method of claim 1, further comprising:

directing at least some of the broad spectrum x-ray radiation to irradiate a second fluorescent target configured to generate monochromatic x-ray radiation via fluorescence in response to incident broadband x-ray radiation;

generating second monochromatic x-ray radiation at a second energy via fluorescence by the second fluorescent target in response to the at least some broad spectrum x-ray radiation incident on the second fluorescent target;

directing at least some of the second monochromatic x-ray radiation to irradiate the subject matter of interest;

detecting at least some of the second monochromatic x-ray radiation transmitted through the subject matter of interest; and determining information about the chemical composition of the subject matter of interest based, at least in part, on the detected second monochromatic x-ray radiation and the second energy.

7. The method of claim 6, wherein determining information about the chemical composition of the subject matter of interest comprises:

computing a first mass absorption coefficient value of the subject matter of interest based, at least in part, on the detected first monochromatic x-ray radiation; and computing a second mass absorption coefficient value of the subject matter of interest based, at least in part, on the detected second monochromatic x-ray radiation.

8. The method of claim 7, wherein determining information about the chemical composition of the subject matter of interest includes using the computed first mass absorption coefficient value and the first energy, and the computed second mass absorption coefficient value and the second energy to determine that material is present in the subject matter of interest.

9. The method of claim 8, wherein determining information about the chemical composition of the subject matter of interest includes identifying one of a plurality of characteristic curves based, at least in part, on the computed first mass absorption coefficient value and the first energy, and the computed second mass absorption coefficient value and the second energy, wherein each of the plurality of characteristic curves represents mass absorption coefficient values as a function of energy for a respective material, and wherein identifying one of the plurality of characteristic curves includes identifying which of the plurality of characteristic curves best matches the computed first mass absorption coefficient value at the first energy and the computed second mass absorption coefficient value at the second energy.

10. The method of claim 6, wherein generating the first monochromatic x-ray radiation comprises:

generating broad spectrum x-ray radiation from an x-ray tube comprising a first target that, in response to being irradiated by electrons, emits the broad spectrum x-ray radiation; and directing at least some of the broad spectrum x-ray radiation to irradiate a second target comprising material that, in response to the irradiation, emits the first monochromatic x-ray radiation;

directing at least some of the broad spectrum x-ray radiation to irradiate a third target comprising material that, in response to the irradiation, emits the second monochromatic x-ray radiation.

11. A system for determining information about a chemical composition of subject matter of interest in vivo, the system comprising:

a monochromatic x-ray radiation source comprising:
a broad spectrum x-ray radiation source; and
a first fluorescent target configured to generate first monochromatic x-ray radiation at a first energy via fluorescence in response to incident broad spectrum x-ray radiation from the broad spectrum x-ray radiation source, wherein at least some of the first monochromatic x-ray radiation is directed to irradiate subject matter of interest internal to a patient in vivo;

a detector array arranged to detect at least some of the first monochromatic x-ray radiation transmitted through the subject matter of interest; and at least one processor programmed to determine information about the chemical composition by determining at least one element, compound and/or molecule that is present in the subject matter of interest based on the detected first monochromatic x-ray radiation and the first energy.

12. The system of claim 11, wherein the at least one processor is programmed to compute a first mass absorption coefficient value of the subject matter of interest based, at least in part, on the detected first monochromatic x-ray radiation.

13. The system of claim 12, wherein the at least one processor is programmed to use the computed first mass absorption coefficient value of the subject matter of interest and the first energy to determine that material is present in the subject matter of interest.

14. The system of claim 13, wherein the at least one processor is programmed to identify one of a plurality of characteristic curves based, at least in part, on the computed first mass absorption coefficient value of the subject matter of interest and the first energy.

15. The system of claim 14, wherein each of the plurality of characteristic curves represents mass absorption coefficient values as a function of energy for a respective material, and wherein at least one processor is programmed to identify which of the plurality of characteristic curves best matches the computed first mass absorption coefficient value at the first energy.

16. The system of claim 11, wherein the monochromatic x-ray source further comprises a second fluorescent target configured to generate second monochromatic x-ray radiation at a second energy via fluorescence in response to incident broad spectrum x-ray radiation from the broad spectrum x-ray radiation source, wherein at least some of the second monochromatic x-ray radiation is directed to irradiate the subject matter of interest, wherein the detector array is configured to detect at least some of the second monochromatic x-ray radiation transmitted through the subject matter of interest, and wherein the at least one processor is configured to determine information about the chemical composition of the subject matter of interest based, at least in part, on the detected second monochromatic x-ray radiation and the second energy.

17. The system of claim 16, wherein at least one processor is programmed to:
compute a first mass absorption coefficient value of the subject matter of interest based, at least in part, on the detected first monochromatic x-ray radiation; and
compute a second mass absorption coefficient value of the subject matter of interest based, at least in part, on the detected second monochromatic x-ray radiation.

18. The system of claim 17, wherein the at least one processor is programmed to use the computed first mass absorption coefficient value and the first energy, and the computed second mass absorption coefficient value and the second energy to determine that material is present in the subject matter of interest.

19. The system of claim 18, wherein the at least one processor is programmed to identify one of a plurality of characteristic curves based, at least in part, on the computed first mass absorption coefficient value and the first energy, and the computed second mass absorption coefficient value and the second energy, wherein each of the plurality of characteristic curves represents mass absorption coefficient values as a function of energy for a respective material, and wherein the at least one processor is programmed to identify which of the plurality of characteristic curves best matches the computed first mass absorption coefficient value at the first energy and the computed second mass absorption coefficient value at the second energy.

20. The system of claim 16, wherein monochromatic x-ray radiation source is configured to:
generate broad spectrum x-ray radiation from an x-ray tube comprising a first target that, in response to being irradiated by electrons, emits the broad spectrum x-ray radiation; and
direct at least some of the broad spectrum x-ray radiation to irradiate a second target comprising material that, in response to the irradiation, emits the first monochromatic x-ray radiation; direct at least some of the broad spectrum x-ray radiation to irradiate a third target comprising material that, in response to the irradiation, emits the second monochromatic x-ray radiation.

* * * * *